(12) United States Patent
Shula et al.

(10) Patent No.: US 11,585,397 B2
(45) Date of Patent: Feb. 21, 2023

(54) PISTON CAP

(71) Applicant: Honeywell International Inc., Charlotte, NC (US)

(72) Inventors: Brian Shula, South Bend, IN (US); Maxwell Lindsay, Mishawaka, IN (US)

(73) Assignee: Honeywell International Inc., Charlotte, NC (US)

( * ) Notice: Subject to any disclaimer, the term of this patent is extended or adjusted under 35 U.S.C. 154(b) by 172 days.

(21) Appl. No.: 17/247,109

(22) Filed: Nov. 30, 2020

(65) Prior Publication Data

US 2022/0170522 A1 Jun. 2, 2022

(51) Int. Cl.
| | |
|---|---|
| *F16D 55/18* | (2006.01) |
| *F16D 55/40* | (2006.01) |
| *F16D 65/18* | (2006.01) |
| *F16D 121/04* | (2012.01) |
| *F16D 125/06* | (2012.01) |

(52) U.S. Cl.
CPC ........... *F16D 55/40* (2013.01); *F16D 65/186* (2013.01); *F16D 2121/04* (2013.01); *F16D 2125/06* (2013.01); *F16D 2200/0052* (2013.01)

(58) Field of Classification Search
CPC . B64C 25/44; F16D 65/0971; F16D 2121/04; F16D 2125/06; F16D 55/40; F16D 65/186; F16D 2200/0052
See application file for complete search history.

(56) References Cited

U.S. PATENT DOCUMENTS

| | | | |
|---|---|---|---|
| 6,637,317 B1 | 10/2003 | Zeibig et al. | |
| 7,344,006 B2 * | 3/2008 | Edmisten | F16D 55/36 |
| | | | 188/73.1 |
| 9,593,728 B2 | 3/2017 | DeMorais et al. | |
| 9,752,634 B2 | 9/2017 | Yasui et al. | |
| 9,874,259 B2 | 1/2018 | Tropp | |
| 9,995,353 B2 | 6/2018 | Rook | |
| 2004/0216604 A1 | 11/2004 | Woodward et al. | |
| 2008/0028923 A1 | 2/2008 | Fujita et al. | |

(Continued)

FOREIGN PATENT DOCUMENTS

| | | |
|---|---|---|
| CN | 207257970 U | 4/2018 |
| EP | 198678 B1 | 3/2008 |
| EP | 3101277 A1 | 12/2016 |

(Continued)

OTHER PUBLICATIONS

Extended Search Report from counterpart European Application No. 21209401.5, dated Mar. 18, 2022, 10 pp.

(Continued)

*Primary Examiner* — Nicholas J Lane (74) *Attorney, Agent, or Firm* — Shumaker & Sieffert, P.A.

(57) ABSTRACT

In some examples, a brake system includes a piston configured to cause a compression of a disc stack. The piston includes a piston body configured to compress a cap face of a piston cap against a pressure plate to cause the compression of the disc stack. The cap face may define a convex surface. The piston cap may be configured such that the convex surface reduces it curvature when the cap face is compressed against the pressure plate. In examples, the piston cap is configured to elastically deform to cause the cap face to reduce the curvature when the cap face is compressed against the pressure plate.

20 Claims, 6 Drawing Sheets

(56) References Cited

U.S. PATENT DOCUMENTS

2013/0001025 A1* 1/2013 Tanabe .................. F16D 65/18
188/72.4

FOREIGN PATENT DOCUMENTS

| JP | 2008039074 A | 2/2008 |
| JP | 2014149032 A | 8/2014 |

OTHER PUBLICATIONS

Response to Extended Search Report dated Mar. 18, 2022, from counterpart European Application No. 21209401.5, filed Apr. 25, 2022, 47 pp.

Abdullah et al., "Contact Analysis of a Dry Friction Clutch System," Hindawi Publishing Corporation, vol. 2013, Aug. 25, 2013, 10 pp.

* cited by examiner

PISTON CAP

TECHNICAL FIELD

The present disclosure relates to a piston cap for a piston, such as, a piston cap for compression of brake disc assemblies in wheel brake systems of a vehicle.

BACKGROUND

Vehicles, such as aircrafts, may use a wheel brake system that includes a multi-disc brake system. For example, the multi-disc brake system may include a plurality of rotors engaged with a wheel and a plurality of stators interleaved with the rotors. The rotors and wheel are configured to rotate around an axle, while the stators remain rotationally stationary. To decelerate rotational motion of a rotating wheel, the brake system may displace pistons against a pressure plate to squeeze the rotating rotors engaged with the wheel against the stationary stators, therefore producing torque that decelerates the rotational motion of the wheel. In some examples, a piston may cause a cap face of the piston to compress against the pressure plate.

SUMMARY

In some examples, the disclosure describes articles, systems, and techniques relating to a brake system of a vehicle. The brake system may include a disc stack configured to reduce and/or prevent a rotation of a wheel when the disc stack is compressed. The brake system may include a piston configured to translate a pressure plate to cause the compression of the disc stack. The piston (e.g., a piston cap) may define a convex surface configured to reduce its curvature (e.g., substantially flatten) when the piston compresses the against the pressure plate. A deformation of the piston when the convex surface reduces its curvature may aid in the transmission of a compression force from the piston to the pressure plate, protecting the pressure plate disc against, for example, high mechanical stresses borne by the pressure plate during braking operations of the brake system.

In an example, the disclosure is directed to a brake system comprising: a pressure plate defining a contact surface, wherein the pressure plate is configured to compress a disc stack of the brake system; and a piston configured to cause the pressure plate to compress the disc stack, the piston comprising: a piston body configured to translate along a piston axis; and a piston cap defining a cap face intersected by the piston axis and defining a perimeter around the piston axis, wherein the cap face defines an inner surface section intersected by the piston axis, an outer surface section adjacent the perimeter, and a medial surface section between the inner surface section and the outer surface section, wherein the medial surface section defines convex surface defining a curvature, wherein the piston body is configured to compress the cap face against the contact surface of the pressure plate to cause the pressure plate to compress the disc stack, and wherein the convex surface is configured to reduce the curvature when the piston body compresses the cap face against the contact surface.

In another example, the disclosure is directed to a brake system comprising: a pressure plate defining a contact surface, wherein the pressure plate is configured to compress a disc stack of the brake system; and a piston defining a piston axis and configured to cause the pressure plate to compress the disc stack, the piston comprising: a piston cap defining a cap face intersected by the piston axis and a back face opposite the cap face, wherein the cap face defines a perimeter around the piston axis and the back face defines a back perimeter around the piston axis, wherein cap face defines an inner surface section intersected by the piston axis, an outer surface section adjacent the perimeter, and a medial surface section between the inner surface section and the outer surface section, and wherein the medial surface section defines a convex surface defining a curvature; and a piston body configured to translate along the piston axis, wherein the piston body and the back face define a piston cavity intersected by the piston axis, wherein the piston body is configured to exert a force on the back perimeter to compress the cap face against the contact surface of the pressure plate, wherein the piston cap is configured such that the concave surface reduces the curvature when the piston body compresses the cap face against the contact surface, and wherein compressing the cap face against the contact surface causes the pressure plate to compress the disc stack.

In another example, the disclosure is directed to a method comprising: translating a piston body of a piston along a piston axis defined by the piston toward a contact surface of a pressure plate; translating a piston cap having a cap face toward the contact surface using the translation of the piston body, the cap face defining an inner surface section intersected by the piston axis, an outer surface section adjacent a perimeter of the cap face, and a medial surface section between the inner surface section and the outer surface section, wherein the medial surface section defines a convex surface defining a curvature; reducing the curvature of the convex surface by compressing the cap face against the contact surface using the piston body; and compressing a disc stack using the pressure plate when the cap face is compressed against the contact surface.

The details of one or more examples are set forth in the accompanying drawings and the description below. Other features, objects, and advantages will be apparent from the description and drawings, and from the claims.

DETAILED DESCRIPTION

The disclosure describes articles, systems, and techniques relating to a piston configured to compress a disc stack in a wheel brake system of a vehicle. The disc stack may be configured to compress between a pressure plate and a backing plate of the brake system, or another portion of the brake system. The piston described herein may be configured to exert a compression force on the pressure plate to translate the pressure plate toward the disc stack, causing compression of the disc stack. Compression of the disc stack may cause engagement of friction surfaces on the brake discs, reducing and/or preventing a rotation of vehicle wheel.

In some examples, the piston includes a piston cap defining a cap face. The piston is configured to compress the cap face against a contact surface of the pressure plate, in order to cause the translation of the pressure plate and compression of the disc stack. The piston may be configured to translate along a piston axis to compress the cap face against the contact surface. The cap face is configured to deflect upon compression against the pressure plate, such that the cap face distributes the compression force more evenly on the contact surface of the pressure plate. The piston cap may be configured to deform when compressed against the pressure plate to cause, for example, the cap face to spread the compression force transmitted from the piston to the pressure plate. The more even distribution may reduce stress concentrations generated during the compression, reducing wear and/or damage to the contact surface of the pressure plate that may occur over repeated braking operations. The reduced stress concentrations may prolong a life of the pressure plate, the piston, or other components of the brake system.

In some braking systems, the exertion of compression forces by a piston against a pressure plate tends to cause specific wear and/or damage patterns on the pressure plate due to, for example, the manner in which a piston cap transmits the force to the pressure plate. In some cases, the piston cap may experience some degree of buckling under the transmitted load, such that a largely non-uniform stress profile generates across the cap face during the compression. The nonuniformity of the stress profile may generate substantial variation in the magnitude of the force being transmitted to the pressure plate at various points on the cap face, leading to large stress concentrations generating on the pressure plate when the cap face is compressed. For example, in systems where a cap face transmits a compression force generated by a substantially tubular piston body pushing the cap face against the pressure plate, the cap face may deform under the load such that a significant portion of the compression force transmits through a ring-shaped area on the cap face, or manifest in some other pattern. These localized force variations resulting from deformation of the piston cap under load may accelerate damage and/or failure of the contact surface of the pressure plate. For example, when the contact surface of the pressure plate includes a relatively brittle layer such as an anti-oxidant coating, the localized force variations may fracture the brittle layer, reducing and/or substantially eliminating the anti-oxidant properties of the coating. The deflection and/or deformation of the piston cap described herein may cause a more effective distribution of force transmitted through the cap face, such that compression of the cap face against the pressure plate generates a more distributed stress profile on the contact surface of the pressure plate.

The piston cap may be configured to deform when the cap face is compressed against the pressure plate. The cap face may define a convex surface defining a curvature, with the cap face configured such that the convex surface reduces its curvature as it contacts the pressure plate. The deformation of the cap face resulting from the reduction of the curvature may act to more effectively distribute a transmitted load across the cap face. In examples, the cap face of the piston cap defines an inner surface section intersected by and/or nearest the piston axis intersecting the cap face, an outer surface section adjacent a perimeter defined by the cap face, and a medial surface section substantially between the inner surface section and the outer surface section. The medial surface section may be configured to substantially curve away from the contact surface of the pressure plate (e.g., define the convexity) when the cap face is in a relaxed state (e.g., when the cap face is displaced from the pressure plate). The piston cap may be configured such that the curved medial surface section substantially deflects to contact the pressure plate during compression against the pressure plate. The deflection of the medial surface section when the cap face is compressed may cause the piston cap to more evenly distribute the compression forces exerted by the piston against the pressure plate, reducing the stress concentrations on the contact surface of the pressure plate during the compression. Hence, the piston cap may be configured to substantially deform under load from the piston, such that the piston cap acts to more uniformly distribute the transmitted load across the cap face.

In some examples, the inner surface section is a region of the cap face intersected by and/or nearest the piston axis intersecting the cap face. The inner surface section may be, for example, a substantially circular, elliptical, or oval shaped region. The medial surface section may substantially surround and/or lie adjacent to the inner surface section. In examples, the medial surface section defines a first ring (e.g., a first annulus) surrounding the inner surface section. The outer surface section is adjacent a perimeter defined by the cap face and may substantially surround and/or lie adjacent to the medial surface section. In examples, the outer surface section may substantially surround the medial surface section and the inner surface section. In examples, the outer surface section defines a second ring (e.g., a second annulus) surrounding the medial surface section and the inner surface section.

The piston cap may be configured such that, when the cap face is in a substantially relaxed state (e.g., displaced from the pressure plate), at least the medial surface section curves away from the contact surface. The cap face may be configured such that when the inner surface section contacts the contact surface, the medial surface section deflects to contact the contact surface when the cap face is compressed against the pressure plate by the piston. The piston cap may deform under the piston load to cause the medial surface section to deflect. In examples, the piston cap is configured such that the resulting deformation causes the piston cap to substantially spread the force transmitted from the piston across the cap face, such that the piston cap more evenly distributes the transmitted force to the contact surface of the pressure plate. Further, the piston cap may be configured such that the deformation reduces and/or substantially eliminates buckling of the piston cap under the piston load, such that compression of the cap face against the pressure plate substantially avoids the generation of stress concentrations which may shorten an operational life of the pressure plate.

The piston cap may include a concave surface on the cap face. The concave surface may define a second curvature, with the cap face configured to reduce the second curvature as it contacts the pressure plate. In some examples, the outer surface section of the cap face defines the concave surface. The piston cap may be configured such that the outer surface section defines the concave surface when the cap face is in a relaxed state (e.g., displaced from the pressure plate). The concavity of the outer surface section may cause a deformation of the piston cap such that the compression force of the piston spreads more effectively across the cap face as the piston cap transmits the compression force from the piston to the pressure plate. In examples, the piston cap is configured such that the medial surface section defines a convexity and the outer surface section defines a concavity when the piston cap is in a relaxed state (e.g., displaced from the pressure plate).

As used here, a convex surface or convexity of the cap face may refer to a portion of a surface having a positive curvature with respect to a vector normal to and extending from the portion of the surface. A concave surface or concavity may refer to a portion of a surface having a negative curvature with respect to the vector extending from and normal to the portion of the surface. In an example, the vector normal to and extending away from the surface has a direction from the cap face toward the contact surface of the pressure plate when the piston is configured to compress the cap face against the contact surface. When a surface reduces its curvature, or when the cap face or another part of the brake system causes a surface to reduce its curvature, this may refer to a surface increasing a radius of curvature of some portion or substantially all of the surface. The surface may be a convex surface or may be a concave surface.

In examples, the piston cap defines a back face opposite the cap face. The piston may define a piston body mechanically engaged with (e.g., attached to) the back face. The piston body may be configured to exert a compression force on the back face causing the piston cap to translate toward the pressure plate. The piston body may exert the compression force to cause the piston cap to compress against the pressure plate and transmit the compression force to the pressure plate. In examples, the piston body exerts the compression force on the back face of the piston cap and causes the piston cap to deform against the pressure plate, such that piston cap distributes the compression force over the cap surface as the piston cap transmits the compression force to the pressure plate. The piston body may be configured to exert the compression force on the back face to, for example, cause the cap face to exert at least a portion of the compression force to the pressure plate, causing the pressure plate to translate an compress a disc stack in a braking system. In examples, the piston axis may intersect the cap face, the back face, and/or the piston body. In some examples, the piston body is mechanically engaged with the piston cap such that the back face and the piston body define a cavity within the piston. For example, the piston body may be a substantially tubular member defining a piston wall and configured such that the piston wall exerts the compression force around a back face perimeter defined by the back face.

The piston cap may define a thickness between the back face and the cap face. In examples, the thickness is defined in a direction substantially parallel to the piston axis. The piston cap may be configured such that a thickness defined at a first point on the cap face varies from a thickness defined at a second point on the cap face. For example, the piston cap may be configured such that a variation in the thickness aids the distribution of a compression force when the piston cap is deformed by compression against the pressure plate. In some examples, a thickness defined at a point on the inner surface section is less than a thickness at a point defined on the medial surface section and/or outer surface section. In some examples, the thickness increases as a distance from the piston axis increases (e.g., increases in a direction from the piston axis toward the perimeter of the piston cap).

Hence, the piston cap may be configured to substantially reduce stress concentrations on the contact surface of a pressure plate when the piston cap causes translation of the pressure plate during braking operations of a brake system. The piston cap may be configured to deform and/or deflect when the cap face is compressed against the pressure plate, such that the piston cap effectively spreads a compression force exerted by a piston body over the cap face. The deformation and/or deflection of the piston cap may cause a more effective distribution of force transmitted through the cap face to the pressure plate, such that the piston cap causes a more distributed stress profile on the pressure plate. The distributed stress profile may limit and/or substantially avoid stress concentrations acting to shorten an operational life of the pressure plate within a braking system of a wheel.

Figure 1:
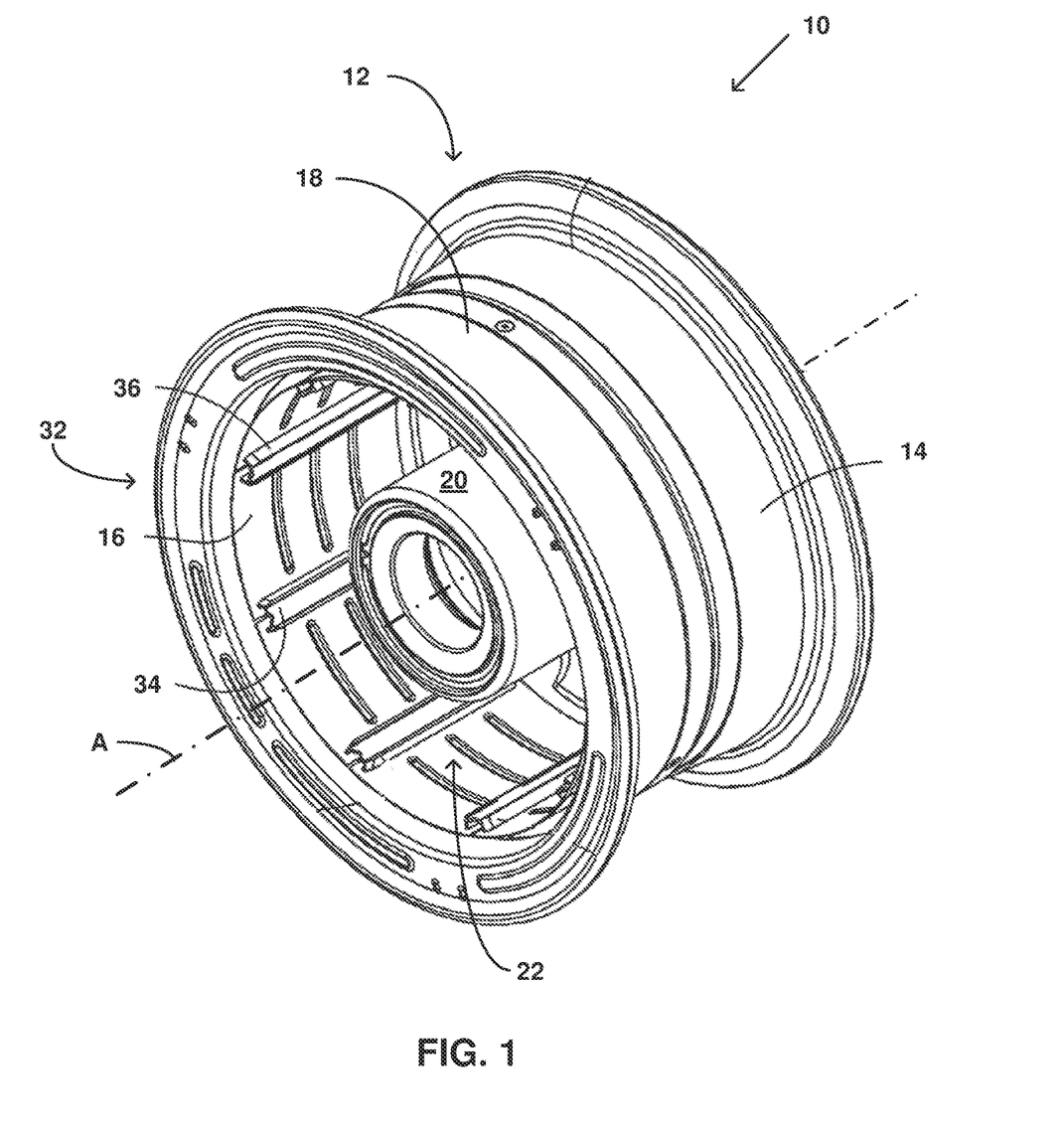
FIG. 1 is a perspective view illustrating an example wheel including a plurality of rotor drive keys on an interior surface of the wheel.

FIG. 1 is a perspective view illustrating an example wheel 10 configured to rotate around an axis A. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. Interior surface 16 and wheel hub 20 may define a wheel cavity 22 (e.g., a volume) between interior surface 16 and wheel hub 20. In some examples, a tire (not shown) may be mounted on exterior surface 14 of rim 12. A plurality of rotor drive keys 32 including rotor drive key 34 and 36 may be mounted on and/or integrally formed with interior surface 16 of wheel 10, such that when wheel 10 (and interior surface 16) rotates around axis of rotation A, each of the rotor drive keys translates over a closed path around axis A. Rotor drive keys 32 may be configured to receive a torque from a braking system (not shown) configured to reduce and/or cease a rotation of wheel 10.

Figure 2:
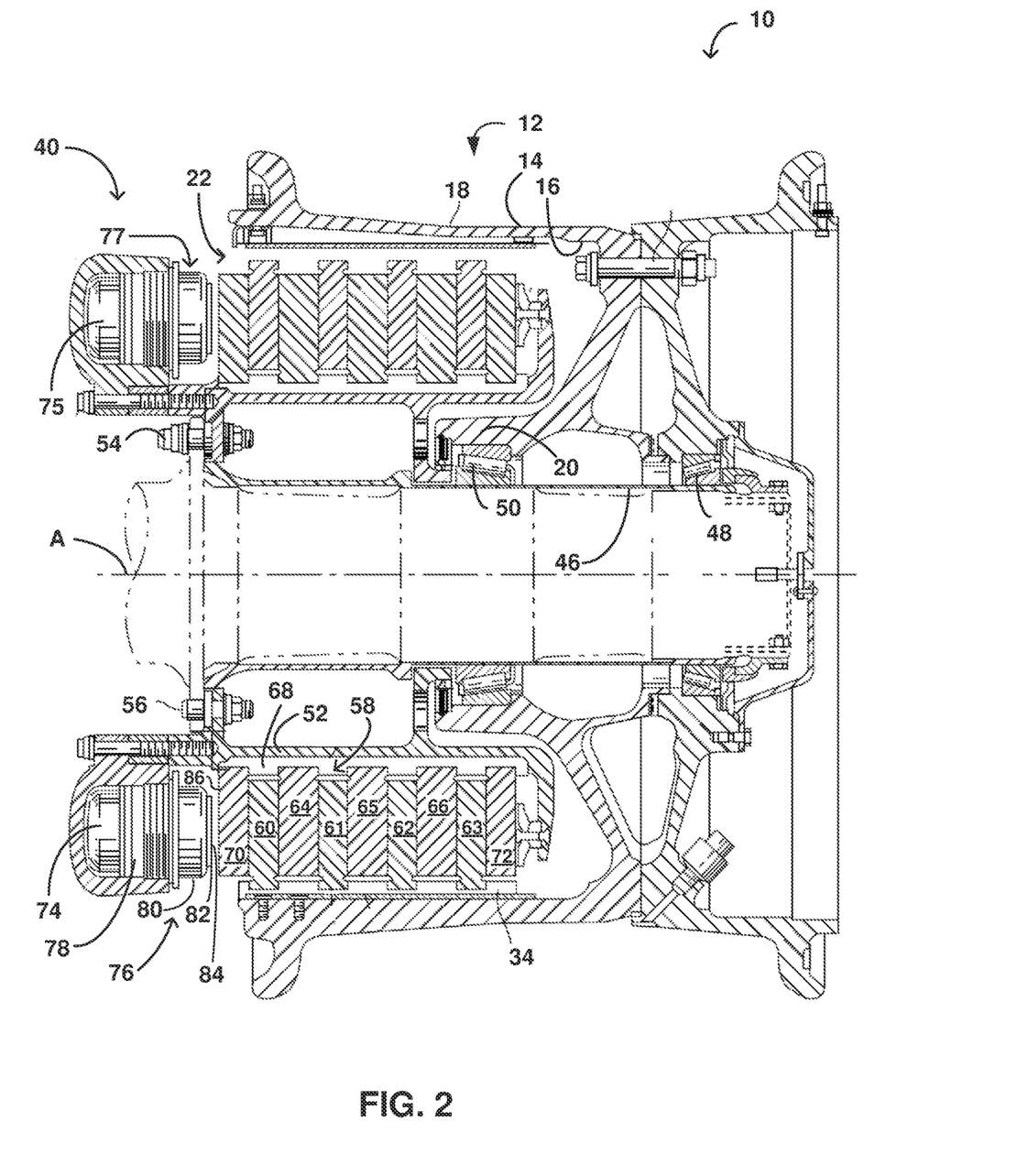
FIG. 2 is a schematic cross-sectional view of an example wheel and brake system including the wheel of FIG. 1.

FIG. 2 is a schematic cross-sectional view illustrating wheel 10 and an example brake system 40. Wheel 10 includes wheel rim 12, exterior surface 14, interior surface 16, wheel cavity 22, wheel hub 20, and rotor drive key 34. Wheel 10 and brake system 40 is shown and described to provide context to the example pistons and/or piston caps described here. The piston and/or piston caps described herein, however, may be used with any system in other examples.

Axis A of wheel 10 extends through axial assembly 46. Axial assembly 46 is figured to support wheel 10 while allowing wheel 10 to rotate around axis A using bearing 48 and bearing 50. For example, bearings 48, 50 may define a substantially circular track around axial assembly 46. A torque tube 52 is coupled to axial assembly 46 (e.g., via bolts 54, 56), such that torque tube 52 remains substantially stationary when wheel 10 rotates around axial assembly 46 and axis A. Torque tube 52 may at least partially surround an exterior of axial assembly 46. Axial assembly 46 may be mechanically coupled to a structure (e.g., a strut) attached to a vehicle.

In the example shown in FIG. 2, brake system 40 is positioned within wheel cavity 22 and is configured to engage torque tube 52 and rotor drive key 34. Brake system 40 is configured to generate a torque to oppose a rotation of wheel 10 around axis A and transfer the torque to rotor drive key 34, reducing and/or eliminating the rotation of wheel 10 around axis A. Brake system 40 includes a disc stack 58 including one or more rotor discs (e.g., rotor discs 60, 61, 62, 63) and one or more stator discs (e.g., stator discs 64, 65, 66). Rotor discs 60, 61, 62, 63, and/or stator discs 64, 65, 66, may have any suitable configuration. For example, rotor discs 60, 61, 62, 63 and/or stator discs 64, 65, 66 can each be substantially annular discs surrounding torque tube 52. Stator discs 64, 65, 66 are coupled to torque tube 52 via spline 68 and remain rotationally stationary with respect to torque tube 52 as wheel 10 rotates. Rotor discs 60, 61, 62, 63 are rotationally coupled to rotor drive key 34 and rotate substantially synchronously with wheel 10 around axis A. Disc stack 58 may include any number of rotor discs and stator discs.

Rotor discs 60, 61, 62, 63, and/or stator discs 64, 65, 66, may be configured to provide opposing friction surfaces for braking a vehicle, such as an aircraft. Compression of disc stack 58 (e.g., between pressure plate 70 and backing plate 72) may bring the opposing friction surfaces into contact, generating shearing forces between the rotor discs rotating substantially synchronously with wheel 10 and the stator discs remaining substantially stationary with respect to torque tube 52. The shearing forces may cause a rotor disc (e.g., rotor discs 60, 61, 62, 63) engaged with rotor drive key 34 to impart a torque on rotor drive key 34 opposing the rotation of wheel 10.

An actuator 74 including actuator body 78 is configured to cause a piston 76 to translate relative to actuator body 78 to compress disc 58. Piston 76 includes piston body 80 and piston cap 82. In examples, piston body 80 is configured to translate to cause piston cap 82 to exert a compression force on pressure plate 70, causing pressure plate 70 to translate in a direction substantially parallel to axis A. Brake system 40 is configured such that the translation of pressure plate 70 compresses disc stack 58 between pressure plate 70 and backing plate 72, engaging the friction surfaces of rotor discs 60, 61, 62, 63 and stator discs 64, 65, 66 to reduce and/or substantially prevent a rotation of wheel 10. Actuator 74 may cause piston 76 to translate using any suitable method. In some examples, actuator 74 is configured to cause translation of piston 76 by supplying and/or venting a pressurized hydraulic fluid to or from a piston chamber. In addition or instead, in some examples, actuator 74 is configured to cause piston 76 to translate through a motion (e.g., a rotary motion) generated by an electric motor. Brake system 40 may include additional actuators, such as actuator 75 configured to cause piston 77 to translate to exert a compression force on pressure plate 70. In examples, brake system 40 includes a plurality of actuators and a plurality of pistons arranged around axis A and configured to exert a compression force on pressure plate 70.

Piston body 80 is configured to exert a compression force on piston cap 82 causing piston cap 82 to compress against pressure plate 70. Piston cap 82 is configured to transmit the compression force from piston body 80 to pressure plate 70, causing compression of disc stack 58 and braking of wheel 10. Piston cap 82 may include a cap face 84 configured to contact pressure plate 70 when piston cap 82 transmits the compression force to pressure plate 70. Cap face 84 may be configured to compress against a contact surface 86 of pressure plate 70 when piston cap 82 transmits the compression force to pressure plate 70. The compression of cap face 84 against contact surface 86 and the transmission of the compression force from piston body 80 to pressure plate 70 generates a stress profile across contact surface 86 and within pressure plate 70. In examples, contact surface 86 may be defined by a relatively brittle portion of pressure plate 70, such as an anti-oxidant coating. For example, contact surface 86 may be defined by a coating comprising a phosphate glass.

Piston cap 82 may be configured to deform when cap face 84 is compressed against contact surface 86. The deformation may cause piston cap 82 to more evenly distribute the compression force from piston body 80 across cap face 84. Piston cap 82 may define a convex surface on cap face 84 configured to substantially reduce its curvature when piston cap 82 is compressed against contact surface 86 of pressure plate 70. In some examples, piston cap 82 defines a concave surface defining a second curvature on piston cap 82, with the concave surface configured to reduce the second curvature when compressed against contact surface 86. The distribution of the compression force across cap face 84 caused by the deformation of piston cap 82 may reduce the resulting stress concentrations within pressure plate 70, potentially extending an operational life of pressure plate 70. In examples, contact surface 86 is defined by a relatively brittle portion of pressure plate 70 (e.g., an anti-oxidant coating). Deformation of piston cap 82 when cap face 84 is compressed against contact surface 86 may more effectively distribute the compression force over an area of contact surface 86, reducing and/or eliminating fracture of the brittle material during braking operations of brake system 40.

Wheel 10 and brake system 40 may be used with any variety of private, commercial, or military aircraft or other type of vehicle. Wheel 10 may be mounted to a vehicle using, for example, bolt 54 and/or bolt 56, or some other fastening device. Axial assembly 46 may be mounted on a strut of a landing gear (not shown) or other suitable component of a vehicle to connect wheel 10 to the vehicle. Wheel 10 may rotate around axis A and axial assembly 46 to impart motion to the vehicle. Wheel 10 is shown and described to provide context to the brake system described herein, however the brake system described herein may be used with any suitable wheel assembly in other examples.

Figure 3:
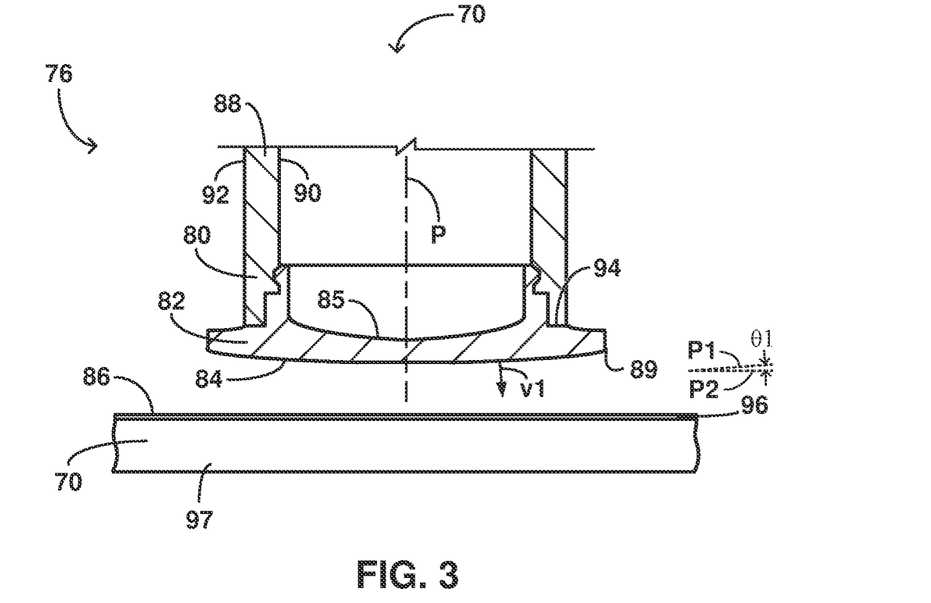
FIG. 3 is a schematic view illustrating an example piston and pressure plate of a brake system.
Figure 4:
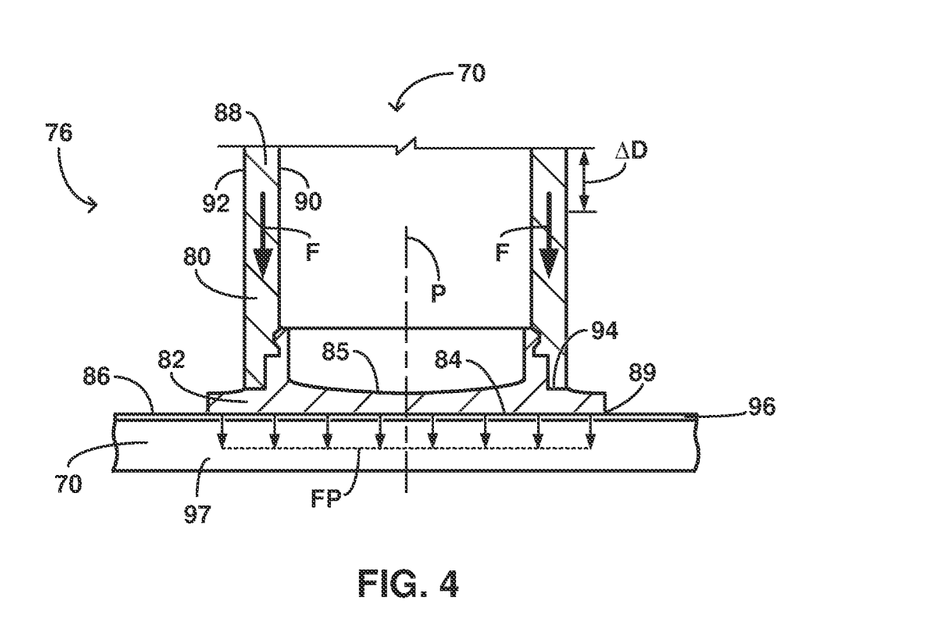
FIG. 4 is a schematic view illustrating the example piston compressed against the pressure plate of FIG. 3.

FIG. 3 and FIG. 4 are schematic illustrations of an example portion of brake system 40 including piston 76 and pressure plate 70. Piston 76 includes piston body 80, piston cap 82, cap face 84, and a back face 85 opposite cap face 84. A piston axis P intersects cap face 84. FIG. 3 illustrates piston cap 82 in a relaxed state and displaced from pressure plate 70. FIG. 4 illustrates piston cap 82 in a deformed state caused by a compression of piston cap 82 against contact surface 86. Piston cap 82 may be configured to compress cap face 84 against contact surface 86 as a result of a compression force F exerted on piston cap 82 by piston body 80. In FIGS. 3 and 4, piston body 80 and piston cap 82 are illustrated as cross-sections with a cutting plane parallel to the page. Piston body 80 is depicted as a substantially tubular member with piston wall 88 at least partially surrounding piston axis P, and defining an piston inner surface 90 facing piston axis P and a piston outer surface 92 on an opposite side of piston wall 88. Piston body 80 may define other shapes in other examples.

Piston cap 82 is configured to define a convex surface on cap face 84 when piston cap 82 is in a relaxed state (e.g., displaced from pressure plate 70). The convex surface may define a curvature. In examples, the curvature of the convex surface (or a portion of the convex surface) has a reciprocal relationship with a radius of curvature, where the radius of curvature is the radius of a circle that best fits a curvature defined by the convex surface. The convex surface may be configured such that when the convex surface reduces the curvature, the radius of curvature increases.

In examples, piston cap 82 defines the convex surface such that cap face 84 substantially curves away from contact surface 86 in the relaxed state. For example, piston cap 82 may define some portion of cap face 84 to have a positive curvature with respect to a vector v1 normal to and extending from cap face 84 when piston cap 82 is in the relaxed state. Piston cap 82 may be in the relaxed state in the absence of a steady-state compression force F exerted by piston body 80 on piston cap 82 and compressing piston cap 82 against pressure plate 70. In examples, when piston cap 82 is in the relaxed state, piston cap 82 is in a substantially zero-stress position, where any stresses on piston cap 82 arise from properties or phenomena internal to bridge member 450, such as mass, internal temperature, residual stresses (e.g., from fabrication and/or mechanical attachment to another component), and the like.

In examples, a plane P1 perpendicular to the vector v1 and a plane P2 perpendicular to the piston axis P define an angle $\theta 1$ between P1 and P2, and the convex surface of cap face 84 is defined to cause the angle $\theta 1$ to increase in a direction from piston axis P to a perimeter 89 defined by cap face 84. Plane P2 may be substantially parallel to a portion of contact surface 86 of pressure plate 70. Piston 82 may be configured such that the angle $\theta 1$ decreases (e.g., decreases to substantially zero degrees) when cap face 84 is compressed against contact surface 70. In other examples, piston 82 may be configured such that the angle $\theta 1$ decreases to some value greater than substantially zero degrees.

Piston cap 82 may be a substantially elastically deforming element which exhibits a change in shape when the compressive force F acts to compress cap face 84 against contact surface 86, and which substantially reverses the change in shape when the compressive force F is removed (e.g., when cap face 84 is displaced from contact surface 86). The compressive force F may be a dependent on a pressure between cap face 84 and contact surface 86, an area of cap face 84, and/or other characteristics of brake system 40 (FIG. 2). The deformation when piston cap 82 is compressed against pressure plate 70 may cause cap face 84 to reduce the curvature of the convex surface contacting contact surface 86, such that piston cap 82 distributes a force transmitted to pressure plate 70 more evenly across cap face 84. In examples, piston cap 82 is configured to deform (e.g., elastically deform) such that a contact pressure on contact surface 86 remains below a threshold contact pressure when piston body 80 compresses cap face 84 against contact surface 86. The threshold contact pressure may be based on, for example, the brittle fracture characteristics of some portion of pressure plate 70 (e.g., an anti-oxidant coating such as layer 96), a limiting stress concentration within pressure plate 70, or some other parameter.

Piston cap 82 is configured such that the convexity on cap face 84 reduces curvature when cap face 84 is compressed against contact surface 86. In examples, cap face 84 reduces the curvature when cap face 84 is compressed against contact surface 86 with a compression force sufficient to cause pressure plate 70 to compress disc stack 58 (FIG. 2). In examples, piston cap 82 is configured such that the convexity substantially flattens when cap face 84 is compressed against contact surface 86. Piston body 80 may be configured to translate to cause cap face 84 to compress cap face 84 against contact surface 86. For example, FIG. 4 illustrates piston body 80 having translated over a displacement $\Delta D$ to cause a compression of cap face 84 against contact surface 86. Piston body 80 may be configured to exert a compression force F on piston cap 82 to cause the compression of cap face 84 against contact surface 86. In FIG. 4, piston body 80 exerts the compression force F on piston cap 82 through piston wall 88 around a back face perimeter 94 defined by back face 85 and at least partially surrounding piston axis P, however piston body 80 may exert the compression force F on other locations of piston cap 82 in other examples.

Piston cap 82 may be configured to deform (e.g., elastically deform) in response to the compression force F compressing cap face 84 against contact surface 86. Piston cap 82 may deform such that the convexity of cap face 84 (FIG. 3) reduces its curvature and/or substantially flattens. Piston cap 82 may deform such that cap face 84 engages (e.g., contacts) contact surface 86 substantially over a section of cap face 84 from piston axis P to a perimeter 89 defined by cap face 84. In examples, a portion of piston cap 82 (e.g., a portion defining the convexity) may be configured to deflect towards contact surface 86 when cap face 84 compresses against contact surface 86. Perimeter 89 may at least partially surround piston axis P. In examples, perimeter 89 is an outer boundary of cap face 84 configured to contact pressure plate 70 when cap face 84 is compressed against pressure plate 70.

Piston cap 82 is configured to transmit the compression force F from piston body 80 to contact surface 86 and pressure plate 70. Piston cap 82 may be configured to transmit the compression force F to cause pressure plate 70 to translate and compress disc stack 58 (FIG. 2). For example, piston cap 82 may be configured to transmit the compression force F to cause a force profile represented by FP on contact surface 86 and pressure plate 70. The force profile FP is representative only and may have any general shape. In examples, piston cap 82 is configured to deform when cap face 84 is compressed against contact surface 86 in order to generate a more evenly distributed force profile FP than might be present in the absence of piston cap 82 deformation. Piston cap 82 may be configured to such that the convexity of cap face 84 substantially flattens when cap face 84 is compressed, such that piston cap 82 distributes the compression force F more evenly over cap face 84. A more even force distribution FP may reduce stress concentrations generated within pressure plate 70 during the compression, reducing wear and/or damage to pressure plate 70 that might occur over repeated applications of the compression force F (e.g., over repeated braking operations). In some examples, contact surface 86 is defined by a layer 96 on a plate body 97 of pressure plate 70, such as an anti-oxidant coating or other layer. The more even force distribution FP may reduce wear and/or damage to layer 96. For example, the more even force distribution may reduce and/or substantially eliminate brittle fractures of layer 96.

Figure 5A:
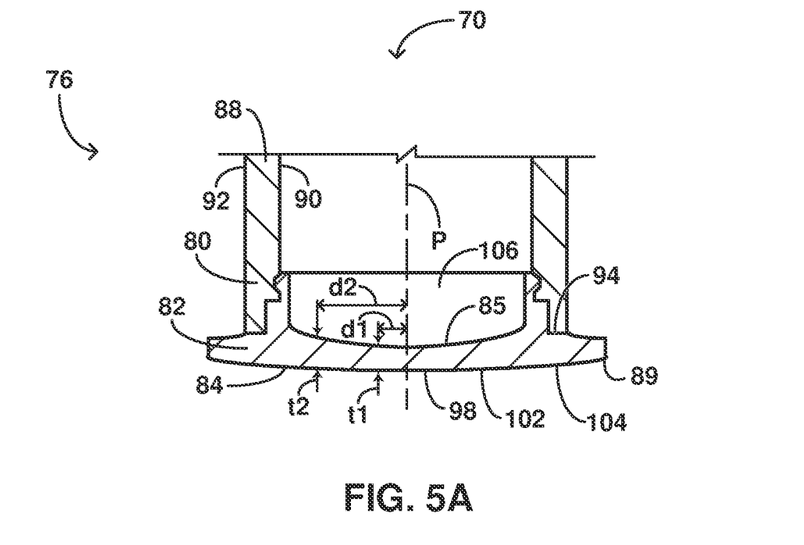
FIG. 5A is a schematic view of the piston of FIGS. 3 and 4.
Figure 5B:
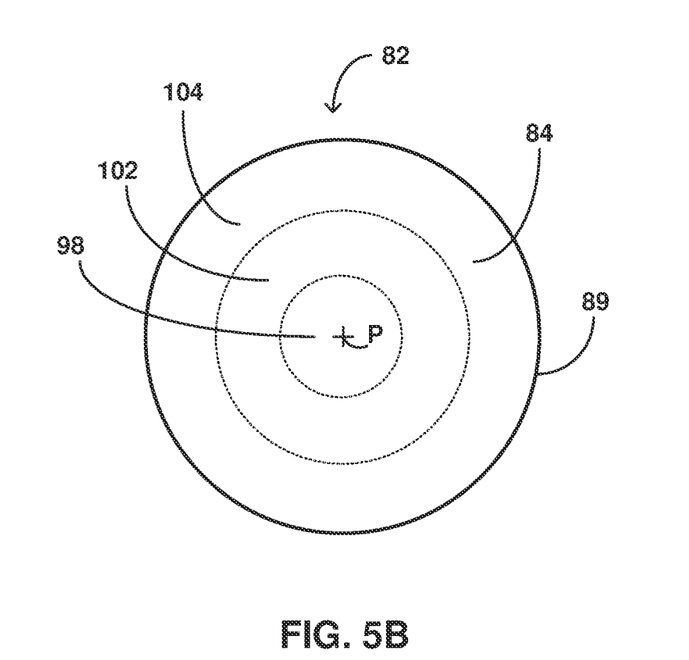
FIG. 5B is a schematic view of the piston of FIG. 5A.

FIG. 5A and FIG. 5B provide a schematic illustrations of piston 76. FIG. 5A illustrates piston body 80 and piston cap 82 as cross-sections with a cutting plane and piston axis P parallel to the page. FIG. 5B illustrates cap face 84 with piston axis P perpendicular to the page. Piston cap 82 may be configured such that cap face 84 defines an inner surface section 98, a medial surface section 102, and an outer surface section 104. In some examples, as illustrated in FIG. 5, both medial surface section 102 and outer surface section 104 define convex surfaces. Inner surface section 98 may define a surface substantially parallel to contact surface 84 (FIGS. 3 and 4) (e.g., substantially perpendicular to piston axis P). In some examples, inner surface section 98 defines an inner convex surface. The inner convex surface may be contiguous with or separate from a convex surface defined by medial surface section 102. In other examples (e.g., FIG. 6), inner surface section 98, medial surface section 102, and/or outer surface section 104 may define a convex surface, a concave surface, or a surface substantially parallel to contact surface 84. For example, medial surface section 102 may define a convex surface while outer surface section 104 defines a concave surface.

Inner surface section 98 may be intersected by and/or nearest piston axis P intersecting cap face 84. Outer surface section 104 may be adjacent perimeter 89 defined by cap face 84. Medial surface section 102 may be substantially between inner surface section 98 and outer surface section 104. In some examples, such as illustrated in FIG. 5B, inner surface section 98 is a substantially circular, elliptical, or oval shaped region of cap face 84 intersected by and/or nearest piston axis P intersecting the cap face. Medial surface section 102 may substantially surround and/or lie adjacent to inner surface section 98. In examples, medial surface section 102 defines a first ring (e.g., an first annulus) surrounding inner surface section 98. Outer surface section 104 may substantially surround and/or lie adjacent to medial surface section 102. In examples, outer surface section 104 substantially surrounds medial surface section 102 and inner surface section 98. In examples, outer surface section 104 defines a second ring (e.g., a second annulus) surrounding medial surface section 102 and inner surface section 98.

Piston cap 82 may be configured such that medial surface section 102 defines a convexity on cap face 84 when piston cap 82 is in a relaxed state (e.g., in the absence of a compression force F (FIGS. 3, 4)). Piston cap 82 may be configured such that medial surface section 102 substantially curves away from pressure plate 70 when piston cap 82 is in the relaxed state. In examples, piston cap 82 is configured to deform when cap face 84 is compressed against pressure plate 70 such that medial surface section 102 substantially deflects to contact the pressure plate 70 during the compression.

In examples, piston cap 82 is configured such that, when piston cap 82 is in a substantially relaxed state and piston 76 is configured to exert a force to translate pressure plate 70 (FIGS. 3, 4). In examples, inner surface section 98 is substantially parallel to contact surface 86. In other examples, inner surface section 98 may define a convexity, or some other curvature. Cap face 84 may be configured such that inner surface section 98 encounters contact surface 86 and medial surface section 102 deflects to encounter contact surface 86 when cap face 84 is compressed against pressure plate 70. In examples, piston cap 82 deforms to cause medial surface section 102 to encounter contact surface 86. Piston cap 82 may be configured such that the deformation reduces and/or substantially eliminates buckling of piston cap 82 under the compression force F. Reducing and/or substantially eliminating buckling of cap face 84 may reduce a tendency of piston cap 82 to deform such that cap face 84 tends to transmit a significant portion (or majority of) the compression F to pressure plate 70 substantially over a ring-shaped area surrounding piston axis P, or through some other pattern tending to generate excessive stress concentrations in pressure plate 70.

In examples, piston body 80 and piston cap 82 may define a cavity 106 (e.g., a volume) within piston 76. Piston cap 82 may be configured such that at least a portion of piston cap 82 deflects inward (e.g., deforms) toward cavity 106 when a force is exerted against cap face 84. For example, piston cap 82 may be configured such that a portion of piston cap 82 including inner surface section 98 deflects inward toward cavity 106 when a force toward cavity 106 is exerted on cap face 84. Piston 76 may be configured such that, when piston cap 82 generates the force profile FP on pressure plate 70 (FIG. 4) and pressure plate 70 exerts an equal and opposite reaction force on cap face 84, cap face 84 and/or back face 85 deflect inward toward cavity 106. In examples, piston 76 is configured such that piston inner surface 90 and back face 85 substantially define piston cavity 106. Piston cap 82 may be configured such that back face 85 is substantially between piston cavity 106 and cap face 84.

Piston cap 82 may be configured such that a portion of piston cap 82 deflects toward cavity 106 when the convex surface defined by cap face 84 substantially flattens (e.g., reduces curvature) as cap face 84 is compressed against contact surface 86. The deflection of piston cap 82 toward cavity 106 may cause a more even distribution of the compression force F across cap face 84 as piston cap 82 transmits the compression force F to pressure plate 70. In examples, when cap face 84 is compressed against contact surface 86, some portion of inner surface section 98 deflects toward cavity 106 as some portion of medial surface section 102 deflects toward contact surface 86.

In examples, piston cap 82 is configured such that a local stiffness (e.g., a stiffness over a section of piston cap 82) varies over piston cap 82. The local stiffness may be dependent on one or more material properties of a material comprising piston cap 82, such as a Young's Modulus, a Possion's Ratio, or other material properties. The local stiffness may be dependent on one or more dimensional properties of piston cap 82, such as a thickness of piston cap 82, a distance of the section from piston axis P, or other dimensional properties. In some examples, piston cap 82 is configured to generate one or more values of an equivalent stiffness when piston cap 82 is compressed against contact surface 86. The equivalent stiffness may be based on one or more material properties and dimensions of piston cap 82 and one or more material properties and dimensions of pressure plate 70. The equivalent stiffness may be based on the deformation of piston cap 82 when cap face 84 is compressed against pressure plate 70. In examples, piston cap 82 is configured such that an equivalent stiffness between piston cap 82 and pressure plate 70 causes a relatively even force profile FP from piston cap 82 to pressure plate 70. In examples, piston cap 82 is configured such that an equivalent stiffness causes a contact pressure between piston cap 82 and pressure plate 70 to remain below a threshold value. In examples, the curvature of piston cap 82 when piston cap 82 is in a relaxed state (e.g., displaced from contact surface 86) is based on a desired compatible stiffness when piston cap 82 compressed against pressure plate 70.

Piston cap 82 may be configured to define a thickness between cap face 84 and back face 85. The thickness may be determined, for example, in a direction substantially parallel to piston axis P. Piston cap 82 may be configured such that he thickness varies based on a distance from piston axis P (e.g., a distance substantially perpendicular to piston axis P). Piston cap 82 may be configured such that, over some portion of piston cap 82, the thickness increases as a distance from piston axis P increases. For example, piston cap 82 may be configured to define a first thickness t1 at a first distance d1 from piston axis P and a second thickness t2 at a second distance d2 from piston axis P, where the first thickness t1 is less than the second thickness t2 and the first distance d1 is less than the second distance d2. Piston cap 82 may be configured such that the variation in thickness aids the distribution of the compression force F to pressure plate 70 when piston cap 82 is deformed by compression against pressure plate 70.

Piston cap 82 may be configured to define a concave surface over some portion of cap face 84 when piston cap 82 is in a relaxed state (e.g., when piston cap 82 is not compressed against pressure plate 70). In examples, piston cap 82 may be configured to define the concave surface over a portion of outer surface section 104. In examples, the concave surface defines a second curvature. In examples, piston cap 82 is configured such that a concavity defined by the concave surface reduces its curvature when cap face 84 is compressed against contact surface 86. In examples, the second curvature of the concave surface (or a portion of the concave surface) has a reciprocal relationship with a second radius of curvature, where the second radius of curvature is the radius of a circle that best fits a curvature defined by the concave surface. The concave surface may be configured such that, when the concave surface reduces the second curvature, the second radius of curvature increases.

In examples, piston cap 82 defines the concave surface over a portion of outer surface section 104. In examples, piston body 80 is configured to exert the compression force F against back face perimeter 94 and the concavity is opposite back face perimeter 94, such that a line parallel to piston axis P intersects both back face perimeter 94 and the concave surface defined on cap face 84. In some examples, piston cap 82 defines the concave surface over a portion of outer surface section 104 and defines a convex surface over a portion of medial surface 102.

Figure 6:
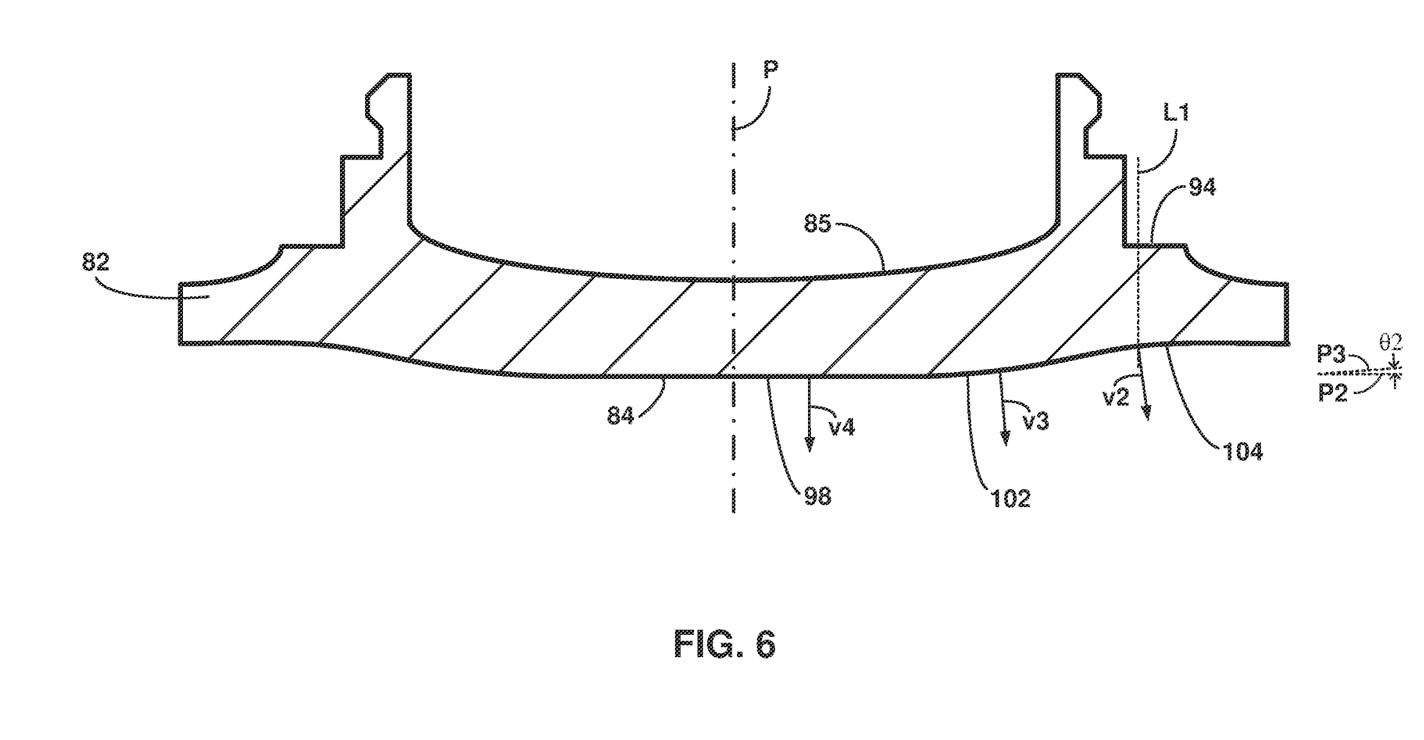
FIG. 6 is a schematic view of a piston cap.

FIG. 6 illustrates a portion of a piston cap 82 in a relaxed state, with piston cap 82 defining a concave surface on cap face 84. Cap face 84 includes inner surface section 98, medial surface section 102, and outer surface section 104. FIG. 6 illustrates piston cap 82 as a cross-section with a cutting plane parallel to the page. In the example of FIG. 6, outer surface section 104 defines a concave surface exhibiting a concavity (e.g., a negative curvature) with respect to the vector v2. Medial surface section 102 defines a convex surface exhibiting a convexity (e.g., a positive curvature) with respect to vector v3. In some examples, inner surface section 98 defines a substantially flat, uncurved surface, such that a portion of inner surface section 98 defines a surface exhibiting a substantially no curvature with respect to vector v4. In other examples, inner surface section 98 may be configured to define a positive of negative curvature with respect to vector v4. Vector v2, vector v3, and vector v4 are normal to and have a direction away from outer surface section 104, medial surface section 102, and inner surface section 98 respectively.

In examples, a plane P3 perpendicular to the vector v2 and the plane P2 perpendicular to the piston axis P define an angle θ2 between P3 and P2, and the concave surface of cap face 84 is defined to cause the angle θ2 to decrease in a direction from vector v2 to perimeter 89 defined by cap face 84. Piston 82 may be configured such that the angle θ2 decreases (e.g., decreases to substantially zero degrees) when cap face 84 is compressed against contact surface 70. In examples, a "substantially flat" surface may mean a surface wherein a plane perpendicular to piston axis P and a plane parallel to the surface define an angle between the planes of less than one degree, in some examples less than 0.5 degrees. In some examples, a "substantially flat" surface has an axial variation generally less than 0.01 inches, in some examples less than 0.005 inches.

Piston cap 82 is configured to receive a compression force (e.g., compression force F (FIG. 4)) at a contact area defined by back face 85, such as back face perimeter 94. Piston cap 82 may define the concave surface on cap face 84 in a location substantially opposite the contact area. In examples, a line parallel to piston axis P intersects both the contact area and the concave surface defined on cap face 84. For example, in FIG. 6, cap face 84 may be configured to receive a compression force from a piston body (e.g., piston body 80 (FIGS. 3, 4, 5A, 5B)) on a contact area substantially defined by back face perimeter 94 of back face 85. A line L1 parallel to piston axis P intersects both back face perimeter 94 and the concave surface defined by cap face 84 over a portion of outer surface section 104. Piston cap 82 is configured such that the concave surface defined by cap face 84 substantially flattens (e.g., reduces its curvature) when a compression force is exerted against back face perimeter 94 and cap face 84 is compressed against pressure plate 70 (FIGS. 2, 3, 4).

Piston cap 82 may be configured such that the flattening of the concavity as cap face 84 is compressed against pressure plate 70 aids the distribution of the compression force across cap face 84, such that a more distributed force profile FP is generated within pressure plate 70.

The cross-sections of piston cap 82 depicted by FIG. 3, FIG. 4, FIG. 5A, FIG. 5B, and FIG. 6 may be cross-sections of a solid of revolution. In examples, some portion or substantially all of cap face 84 and/or back face 85 define a plane curve within a plane including piston axis P, and a shape of piston cap 82 is substantially defined by a complete or partial revolution of the plane curve around piston axis P. Piston cap 82 may have other shapes and be defined by other methods in other examples.

Cap face 84, back face 85, piston body 80, and/or other portions of piston 76 may have any suitable orientation relative to piston axis P. Piston body 80 may engage piston cap 82 in any suitable manner and with any fit sufficient to exert a compression force on piston cap 82. In examples, piston body 80 mechanically engages piston cap 82 using a weld, a solder, a fastener, and adhesive, threading, an engineering fit such as a sliding fit, a locational fit, a transitional fit, or an interference fit, or some other mechanical engagement.

Piston cap 82, piston body 80, pressure plate 70, brake system 40, wheel 10, and the components thereof, may be formed to have any shape. In some examples, two or more components of piston cap 82, piston body 80, pressure plate 70, brake system 40, and/or wheel 10 are formed to be physically separate from each other and subsequently joined and/or attached to piston cap 82, piston body 80, pressure plate 70, brake system 40, and/or wheel 10. In other examples, two or more components of piston cap 82, piston body 80, pressure plate 70, brake system 40, and/or wheel 10 have a unitary body construction, e.g., are formed to be one piece.

Piston cap 82, piston body 80, pressure plate 70, brake system 40, wheel 10, and the components thereof, may be made from any suitable material. For example, the material may be any material of suitable strength for the intended use of piston cap 82, piston body 80, pressure plate 70, brake system 40, wheel 10, and the components thereof. In some examples, the material includes a metal or a metal alloy. Piston cap 82, piston body 80, pressure plate 70, brake system 40, wheel 10, and the components thereof, can be formed using any suitable technique. Piston cap 82, piston body 80, pressure plate 70, brake system 40, wheel 10, and the components thereof may be forged, casted, made from bar stock, additive manufactured (e.g., three-dimensionally (3D) printed), extruded, drawn, or be produced using other suitable methods. In some examples, piston cap 82, piston body 80, pressure plate 70, brake system 40, wheel 10, and the components thereof may be machined to define the configurations described herein. In other examples, piston cap 82, piston body 80, pressure plate 70, brake system 40, wheel 10, and the components thereof may be formed without having to be substantially machined.

Wheel 10 may be finish machined from a near-net-shaped aluminum forging and contain an axial assembly and/or wheel rim for assembly of brake system 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including rotor discs 60, 61, 62, 63 and stator discs 64, 65, 66, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

Figure 7:
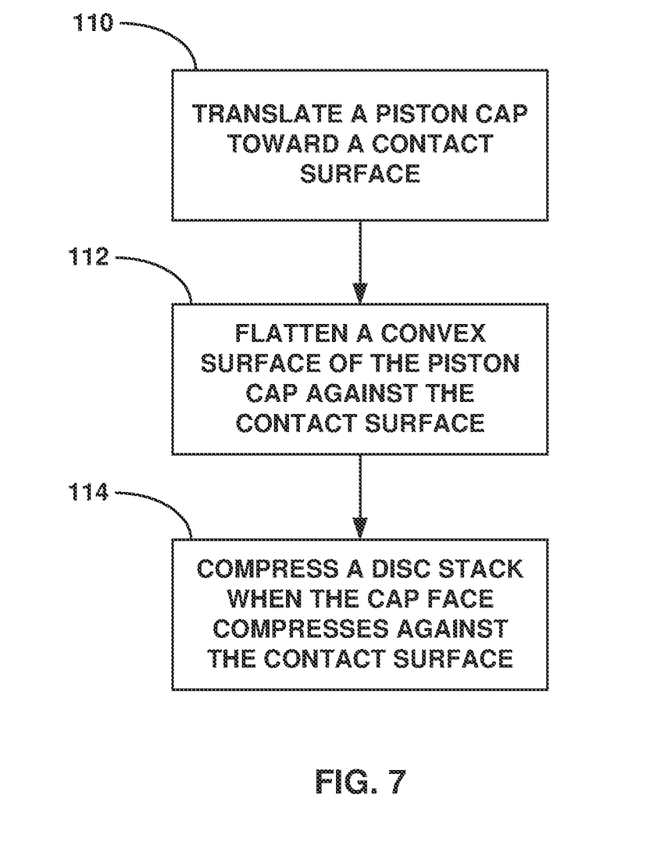
FIG. 7 is a flow diagram illustrating an example technique of compressing a disc stack.

FIG. 7 illustrates a flow diagram of an example technique for operating a brake system. Although the technique is mainly described with reference to piston 76 and the components thereof (FIGS. 2-6), the technique may be used with other pistons in other examples.

The technique includes translating a piston 76 toward a pressure plate 70 of a brake system 40 (110). The technique may include translating piston 76 toward pressure plate 70 using an actuator 74 of brake system 40. Brake system 40 may be within a wheel cavity 22 of a wheel 10 and configured to reduce and/or prevent a rotation of wheel 10 around an axis A. In examples, the technique includes translating a piston cap 82 of piston 76 toward pressure plate 70 using a translation of a piston body 80 of piston 76. The technique may include translating piston 76 in a direction substantially parallel to the axis A.

The technique includes compressing a cap face 84 of piston cap 82 against a contact surface 86 of pressure plate 70. The technique may include using piston body 80 to exert a compression force F on piston cap 82 to cause cap face 84 to compress against contact surface 86. The technique includes reducing a curvature of (e.g., substantially flattening) a convex surface defined by cap face 84 when cap face 84 is compressed against contact surface 86 (112). The convex surface may define a convexity having a positive curvature relative to a vector v1, v3 normal to and extending from cap face 84 in a direction toward contact surface 86. The technique may include elastically deforming piston cap 82 when cap face 84 is compressed against contact surface 86. In examples, cap face 84 is intersected by a piston axis P of piston 76. The technique may include translating piston 76 in a direction substantially parallel to piston axis P. The technique may include generating a force profile FP within pressure plate 70 when cap face 84 is compressed against contact surface 86.

Cap face 84 may define an inner surface section 98 intersected by piston axis P, an outer surface section 104 adjacent a perimeter 89 of cap face 84, and a medial surface section 102 between inner surface section 98 and outer surface section 104. Medial surface section 102 may define the convex surface. In examples, the technique includes contacting medial surface section 102 and contact surface 86 when cap face 84 is compressed against contact surface 86. The technique may include elastically deforming piston cap 82 such that medial surface section 102 deflects toward contact surface 86.

The technique includes compressing a disc stack 58 when cap face 84 compresses against contact surface 86 (114). The technique may include translating pressure plate 70 using the compression of cap face 84 against contact surface 86. Pressure plate 70 may be configured to cause the compression of disc stack 58 when pressure plate 70 translates. In examples, brake system 40 is configured to cause pressure plate 70 to exert a reaction force against cap face 84 when cap face 84 compresses against contact surface 86.

In examples, the technique includes deflecting a portion of piston cap 82 toward a piston cavity 106 defined within piston 76 when cap face 84 compresses against contact surface 86. Piston cavity 106 may be defined by piston body 80 and a back face 85 of piston cap 82 opposite cap face 84. In examples, back face 85 defines a back face perimeter 94 at least partially surrounding piston axis P and/or piston cavity 106, and piston body 80 exerts the compression force F on back face perimeter 94. In examples, the technique includes deflecting a portion of piston cap 82 toward piston cavity 106 wherein the portion of piston cap 82 is configured to define an increasing thickness between cap face 84 and back face 85 as a distance from piston axis P increases.

The technique may include reducing a curvature of a concave surface defined by cap face 84 when cap face 84 is compressed against contact surface 86. The concave surface may define a concavity having a negative curvature relative to a vector v2 normal to and extending from cap face 84 in a direction toward contact surface 86. In examples, outer surface section 104 defines the concave surface. The technique may include elastically deforming piston cap 82 when cap face 84 compresses against contact surface 86 to cause the concave surface to reduce its curvature. The technique may include reducing a curvature of the concave surface when cap face 84 compresses against contact surface 86.

The present disclosure includes the following examples.

Example 1

A brake system comprising: a pressure plate defining a contact surface, wherein the pressure plate is configured to compress a disc stack of the brake system; and a piston configured to cause the pressure plate to compress the disc stack, the piston comprising: a piston body configured to translate along a piston axis; and a piston cap defining a cap face intersected by the piston axis and defining a perimeter around the piston axis, wherein the cap face defines an inner surface section intersected by the piston axis, an outer surface section adjacent the perimeter, and a medial surface section between the inner surface section and the outer surface section, wherein the medial surface section defines convex surface defining a curvature, wherein the piston body is configured to compress the cap face against the contact surface of the pressure plate to cause the pressure plate to compress the disc stack, and wherein the convex surface is configured to reduce the curvature when the piston body compresses the cap face against the contact surface.

Example 2

The brake system of example 1, wherein the inner surface section is configured to be substantially parallel to the contact surface when the cap face is displaced from the contact surface.

Example 3

The brake system of example 1 or 2, wherein the piston cap is configured to elastically deform such that the inner surface section and the medial surface section contact the contact surface when the piston body compresses the cap face against the contact surface.

Example 4

The brake system of any of examples 1-3, wherein the cap face defines a concave surface defining a second curvature, wherein the concave surface is configured to reduce the second curvature when the piston body compresses the cap face against the contact surface.

Example 5

The brake system of examples 4, wherein the outer surface section defines the concave surface.

Example 6

The brake system of any of examples 1-5, wherein the piston cap defines a back face opposite the cap face, wherein the piston cap defines a thickness substantially parallel to the piston axis from the cap face to the back face, and wherein the thickness increases as a distance from the piston axis toward the perimeter increases.

Example 7

The brake system of any of examples 1-6, wherein the piston cap defines a back face opposite the cap face, wherein the back face defines a back perimeter around the piston axis, and wherein the piston body is configured to exert a force on the back perimeter to cause the piston body to compress the cap face against the contact surface.

Example 8

The brake system of any of examples 1-7, wherein the pressure plate includes a plate body layered by a coating, wherein the coating defines the contact surface, and wherein the coating is more brittle than the plate body.

Example 9

The brake system of any of examples 1-8, wherein: the piston cap defines a back face opposite the cap face; the piston body defines a piston wall having an inner surface facing the piston axis and an outer surface opposite the inner surface; the inner surface and the back face define a piston cavity intersected by the piston axis; and the piston wall is configured to exert a force on the back face to cause the piston body to compress the cap face against the contact surface.

Example 10

The brake system of any of examples 1-9, wherein the piston body and the piston cap define a cavity within the piston, wherein the piston cap is between the contact surface and the cavity, and wherein the piston cap is configured to deflect towards the cavity when the piston body compresses the cap face against the contact surface.

Example 11

The brake system of any of examples 1-10, wherein the brake system is configured to cause the pressure plate to exert a reaction force on the cap face when the when the piston body compresses the cap face against the contact surface.

Example 12

The brake system of any of examples 1-11, wherein the pressure plate comprises a carbon composite material.

Example 13

The brake system of any of examples 1-12, further comprising the disc stack, wherein the disc stack includes at least one rotor disc and at least one stator disc, wherein the brake system is configured to cause a friction surface on the rotor disc to contact a friction surface on the stator disc when the piston body compresses the cap face against the contact surface.

Example 14

The brake system of any of examples 1-13, wherein the disc stack includes a stator disc configured to remain rotationally stationary with respect to a torque tube of the brake system and a rotor disc configured to rotate relative to the torque tube of the brake system.

Example 15

A brake system comprising: a pressure plate defining a contact surface, wherein the pressure plate is configured to compress a disc stack of the brake system; and a piston defining a piston axis and configured to cause the pressure plate to compress the disc stack, the piston comprising: a piston cap defining a cap face intersected by the piston axis and a back face opposite the cap face, wherein the cap face defines a perimeter around the piston axis and the back face defines a back perimeter around the piston axis, wherein the cap face defines an inner surface section intersected by the piston axis, an outer surface section adjacent the perimeter, and a medial surface section between the inner surface section and the outer surface section, and wherein the medial surface section defines a convex surface defining a curvature; and a piston body configured to translate along the piston axis, wherein the piston body and the back face define a piston cavity intersected by the piston axis, wherein the piston body is configured to exert a force on the back perimeter to compress the cap face against the contact surface of the pressure plate, wherein the piston cap is configured such that the concave surface reduces the curvature when the piston body compresses the cap face against the contact surface, and wherein compressing the cap face against the contact surface causes the pressure plate to compress the disc stack.

Example 16

The brake system of example 15, wherein the piston body and the piston cap define a cavity within the piston, wherein the piston cap is between the contact surface and the cavity, and wherein the piston cap is configured to deflect towards the cavity when the piston body compresses the cap face against the contact surface.

Example 17

The brake system of examples 15 or 16, wherein the inner surface section is configured to be substantially parallel to the contact surface when the cap face is displaced from the contact surface.

Example 18

The brake system of any of examples 15-17, wherein the outer surface section defines a concave surface.

Example 19

A method, comprising: translating a piston body of a piston along a piston axis defined by the piston toward a contact surface of a pressure plate; translating a piston cap having a cap face toward the contact surface using the translation of the piston body, the cap face defining an inner surface section intersected by the piston axis, an outer surface section adjacent a perimeter of the cap face, and a medial surface section between the inner surface section and the outer surface section, wherein the medial surface section defines a convex surface defining a curvature; reducing the curvature of the convex surface by compressing the cap face against the contact surface using the piston body; and compressing a disc stack using the pressure plate when the cap face is compressed against the contact surface.

Example 20

The example of claim 19, further comprising exerting a force on a back perimeter of a back face of the piston cap opposite the cap face using the piston body, the back perimeter surrounding the piston axis.

Various examples have been described. These and other examples are within the scope of the following claims.

What is claimed is:

1. A brake system comprising:
 a pressure plate defining a contact surface, wherein the pressure plate is configured to compress a disc stack of the brake system; and
 a piston configured to cause the pressure plate to compress the disc stack, the piston comprising:
  a piston body configured to translate along a piston axis; and
  a piston cap defining a cap face intersected by the piston axis and defining a perimeter around the piston axis,
  wherein the cap face defines an inner surface section intersected by the piston axis, an outer surface section adjacent the perimeter, and a medial surface section between the inner surface section and the outer surface section,
  wherein the medial surface section defines convex surface defining a curvature,
  wherein the piston body is configured to compress the cap face against the contact surface of the pressure plate to cause the pressure plate to compress the disc stack,
  wherein the convex surface is configured to reduce the curvature when the piston body compresses the cap face against the contact surface,
  wherein the piston cap defines a back face opposite the cap face and defines a thickness substantially parallel to the piston axis from the cap face to the back face, and
  wherein the thickness increases as a distance from the piston axis toward the perimeter increases over at least a portion of the piston cap.

2. The brake system of claim 1, wherein the inner surface section is configured to be substantially parallel to the contact surface when the cap face is displaced from the contact surface.

3. The brake system of claim 1, wherein the piston cap is configured to elastically deform such that the inner surface section and the medial surface section contact the contact surface when the piston body compresses the cap face against the contact surface.

4. The brake system of claim 1, wherein the cap face defines a concave surface defining a second curvature, wherein the concave surface is configured to reduce the second curvature when the piston body compresses the cap face against the contact surface.

5. The brake system of claim 4, wherein the outer surface section defines the concave surface.

6. The brake system of claim 1, wherein the back face defines a back perimeter around the piston axis, and wherein the piston body is configured to exert a force on the back perimeter to cause the piston body to compress the cap face against the contact surface.

7. The brake system of claim 1, wherein the pressure plate includes a plate body layered by a coating, wherein the coating defines the contact surface, and wherein the coating is more brittle than the plate body.

8. The brake system of claim 1, wherein:
 the piston body defines a piston wall having an inner surface facing the piston axis and an outer surface opposite the inner surface;
 the inner surface and the back face define a piston cavity intersected by the piston axis; and
 the piston wall is configured to exert a force on the back face to cause the piston body to compress the cap face against the contact surface.

9. The brake system of claim 1, wherein the piston body and the piston cap define a cavity within the piston, wherein the piston cap is between the contact surface and the cavity, and wherein the piston cap is configured to deflect towards the cavity when the piston body compresses the cap face against the contact surface.

10. The brake system of claim 1, wherein the brake system is configured to cause the pressure plate to exert a reaction force on the cap face when the piston body compresses the cap face against the contact surface.

11. The brake system of claim 1, wherein the pressure plate comprises a carbon composite material.

12. The brake system of claim 1, further comprising the disc stack, wherein the disc stack includes at least one rotor disc and at least one stator disc, wherein the brake system is configured to cause a friction surface on the rotor disc to contact a friction surface on the stator disc when the piston body compresses the cap face against the contact surface.

13. The brake system of claim 1, wherein the disc stack includes a stator disc configured to remain rotationally stationary with respect to a torque tube of the brake system and a rotor disc configured to rotate relative to the torque tube of the brake system.

14. A brake system comprising:
 a piston defining a piston axis and configured to cause a pressure plate of the brake system to compress a disc stack of the brake system, the piston comprising:
  a piston cap defining a cap face intersected by the piston axis and a back face opposite the cap face, wherein the cap face defines a perimeter around the piston axis and the back face defines a back perimeter around the piston axis, wherein the cap face defines an inner surface section intersected by the piston axis, an outer surface section adjacent the perimeter, and a medial surface section between the inner surface section and the outer surface section, and wherein the medial surface section defines a convex surface defining a curvature, wherein the piston cap defines a thickness substantially parallel to the piston axis from the cap face to the back face; and a piston body configured to translate along the piston axis, wherein the piston body is configured to exert a force on the back perimeter to compress the cap face against a contact surface of the pressure plate, wherein the convex surface is configured to reduce the curvature when the piston body compresses the cap face against the contact surface, and wherein the thickness increases as a distance from the piston axis toward the back perimeter increases over at least a portion of the piston face.

15. The brake system of claim 14, wherein the piston body and the piston cap define a cavity within the piston, wherein the piston cap is between the contact surface and the cavity, and wherein the piston cap is configured to deflect towards the cavity when the piston body compresses the cap face against the contact surface.

16. The brake system of claim 14, wherein the inner surface section is configured to be substantially parallel to the contact surface when the cap face is displaced from the contact surface.

17. The brake system of claim 14, wherein the outer surface section defines a concave surface.

18. A method, comprising:

translating a piston body of a piston along a piston axis defined by the piston toward a contact surface of a pressure plate;

translating a piston cap having a cap face toward the contact surface using the translation of the piston body, the cap face defining an inner surface section intersected by the piston axis, an outer surface section adjacent a perimeter of the cap face, and a medial surface section between the inner surface section and the outer surface section, wherein the medial surface section defines a convex surface defining a curvature, and the piston cap defining a back face opposite the cap face, wherein the piston cap defines a thickness substantially parallel to the piston axis from the cap face to the back face, wherein the thickness increases as a distance from the piston axis toward the perimeter of the cap face increases;

reducing the curvature of the convex surface by compressing the cap face against the contact surface using the piston body; and compressing a disc stack using the pressure plate when the cap face is compressed against the contact surface.

19. The method of claim 18, further comprising exerting a force on a back perimeter of the back face using the piston body, the back perimeter surrounding the piston axis.

20. The brake system of claim 6, wherein the distance from the piston axis toward the perimeter is a distance from the piston axis toward the back perimeter.

* * * * *